(12) United States Patent  
Young

(10) Patent No.: US 12,204,429 B2  
(45) Date of Patent: Jan. 21, 2025

(54) SYSTEM AND METHOD FOR LIMITING MAXIMUM RUN TIME FOR AN APPLICATION

(71) Applicant: Bryan Allen Young, Cle Elum, WA (US)

(72) Inventor: Bryan Allen Young, Cle Elum, WA (US)

( * ) Notice: Subject to any disclaimer, the term of this patent is extended or adjusted under 35 U.S.C. 154(b) by 0 days.

(21) Appl. No.: 18/085,432

(22) Filed: Dec. 20, 2022

(65) Prior Publication Data

US 2023/0385067 A1    Nov. 30, 2023

Related U.S. Application Data

(63) Continuation of application No. 16/453,856, filed on Jun. 26, 2019, now abandoned.

(60) Provisional application No. 62/690,217, filed on Jun. 26, 2018.

(51) Int. Cl.
*G06F 11/30* (2006.01)
*G06F 9/44* (2018.01)
*G06F 11/34* (2006.01)

(52) U.S. Cl.
CPC .......... *G06F 11/3055* (2013.01); *G06F 9/44* (2013.01); *G06F 11/302* (2013.01); *G06F 11/3065* (2013.01); *G06F 11/3423* (2013.01)

(58) Field of Classification Search
None
See application file for complete search history.

(56) References Cited

U.S. PATENT DOCUMENTS

| | | | | |
|---|---|---|---|---|
| 6,085,218 A | * | 7/2000 | Carmon | G06F 11/3409 718/107 |
| 8,473,251 B1 | * | 6/2013 | Noth | G06F 11/079 702/183 |
| 2005/0015767 A1 | * | 1/2005 | Nash | G06F 9/4887 718/102 |
| 2005/0086255 A1 | * | 4/2005 | Schran | H04L 67/55 714/E11.193 |
| 2005/0160425 A1 | * | 7/2005 | Falsett | G06F 9/4812 718/100 |
| 2011/0038542 A1 | * | 2/2011 | Barkan | G06Q 10/10 382/182 |

(Continued)

*Primary Examiner* — Qing Chen
(74) *Attorney, Agent, or Firm* — FisherBroyles, LLP

(57) ABSTRACT

An application or other non-transitory computer-readable medium for storing instructions is disclosed. The instructions are executed by at least one processing device which is configured to store at least one user preference. The at least one user preference comprises a selection of one or more monitored applications and one or more warning thresholds corresponding to the one or more monitored applications. The one or more warning thresholds comprise a user selected time period. Further, time information associated with a use of the one or more monitored applications, is obtained. The time information is determined according to an accessibility event notifications function, on an operating system of a device. Further, the at least one user preference and the obtained time information are compared to determine whether the one or more warning thresholds have been exceeded. Thereafter, a notification is delivered to the user, upon exceeding the one or more warning thresholds.

18 Claims, 15 Drawing Sheets

(56) References Cited

U.S. PATENT DOCUMENTS

| | | | |
|---|---|---|---|
| 2012/0150895 A1* | 6/2012 | Barsness | G06F 16/245 |
| | | | 707/769 |
| 2012/0215764 A1* | 8/2012 | Barsness | G06F 16/951 |
| | | | 707/720 |
| 2013/0080522 A1* | 3/2013 | Ren | H04W 12/08 |
| | | | 709/204 |
| 2013/0219342 A1* | 8/2013 | Nosou | G06Q 10/107 |
| | | | 715/835 |
| 2014/0282582 A1* | 9/2014 | Clark | G06F 8/60 |
| | | | 718/104 |
| 2015/0100967 A1* | 4/2015 | Clark | G06F 9/5027 |
| | | | 718/103 |
| 2016/0007083 A1* | 1/2016 | Gurha | H04N 21/25808 |
| | | | 725/13 |
| 2016/0323307 A1* | 11/2016 | Savant | G06F 3/04842 |
| 2017/0118610 A1* | 4/2017 | Schieman | G06F 11/3466 |
| 2017/0168914 A1* | 6/2017 | Altman | G06F 11/3072 |
| 2017/0361870 A1* | 12/2017 | Naganathan | G06F 11/3419 |
| 2017/0364389 A1* | 12/2017 | Naganathan | G06F 11/302 |
| 2019/0163535 A1* | 5/2019 | Ermler | G06F 9/5038 |
| 2019/0379627 A1* | 12/2019 | Wang | H04L 51/224 |

* cited by examiner

SYSTEM AND METHOD FOR LIMITING MAXIMUM RUN TIME FOR AN APPLICATION

PRIORITY CLAIM

The present application is a Continuation of U.S. patent application Ser. No. 16/453,856 filed Jun. 26, 2019, which claims the benefit of U.S. Provisional Application Ser. No. 62/690,217 filed Jun. 26, 2018, both of which are incorporated by reference herein.

BACKGROUND OF THE INVENTION

Modern electronic devices are fantastic tools, providing connectivity, productivity, and entertainment all in a single electronic device. Modern electronic devices are equipped with various new tools that can be used to control and track information such as when and how much a user uses applications on the device. Such information is very useful to users. Currently, traditional time management and parental control software require a network connection to be present, their own configuration application (App), or a separate device to configure altogether. Further, existing attempts at application management tend to overly restrict an application, thus disabling useful features of the application as a consequence of the restriction.

Typically, there are instances occurring external to a program on a computer. The instances may be a video card finishing drawing, a depressed key on a keyboard, or an operating system updating how long a program has been running. Further, the instances may be generalized as objects from the program's point of view. The objects provide a mechanism to check their status. In computer science, one or more methods are used for checking the status of the object such as how long the program has been executing. For example, a polling method is used for checking the status of the object. With polling, a processor of the computer is used to ask the object for a status update at regular intervals, such as every 1 second. It should be noted that one or more intelligent devices such as graphics devices on a computer can perform polling. Polling requires the computer to be awake at every polling interval. In addition, every time a status update request goes out, more work occurs and a little more of a device's battery power is used. It should be noted that resources such as memory allocations, may be kept around in both the caller of the status update and the provider. Further; Nyquist's sampling theorem states that guaranteed accuracy with polling will be two-times the polling rate. For example, asking Android for how long another process has been executing can be off. Finally, if the device sleeps, then polling does not occur, and the status updates may be permanently lost. Further, there are many factors that may influence a polling interval. For example, devices on the computer system are continuously being throttled.

Therefore, there is a need for an improved method and system for monitoring and managing applications running on the operating system of a device, i.e. time and application management.

SUMMARY OF THE INVENTION

According to embodiments illustrated herein, a non-transitory computer-readable medium for storing instructions is disclosed. The instructions are executed by at least one processing device which is configured to store at least one user preference. The at least one user preference comprises a selection of one or more monitored applications and one or more warning thresholds corresponding to the one or more monitored applications. The one or more warning thresholds comprise a user selected time period. The at least one processing device is further configured to obtain time information associated with a use of the one or more monitored applications. The time information is determined according to an accessibility event notifications function, on an operating system of a device. The at least one processing device is further configured to compare the at least one user preference and the obtained time information to determine whether the one or more warning thresholds have been exceeded. Thereafter, the at least one processing device is configured to deliver a notification to the user upon exceeding the one or more warning thresholds.

According to embodiments illustrated herein, a method for limiting maximum run time for an application is disclosed. The method includes receiving, by at least one processing device, at least one user preference. The at least one user preference comprises a selection of one or more monitored applications and one or more warning thresholds corresponding to the one or more monitored applications. The one or more warning thresholds comprise a user selected time period. The method further includes obtaining, by the at least one processing device, time information associated with a use of the one or more monitored applications. The time information is determined according to an accessibility event notifications function, on an operating system of a device. The method further includes comparing, by the at least one processing device, the at least one user preference and the obtained time information to determine whether the one or more warning thresholds have been exceeded. Thereafter, the method includes delivering, by the at least one processing device, a notification, upon exceeding the one or more warning thresholds, to the user, and thereby limiting the maximum run time for the application.

According to additional embodiments illustrated herein, a device for limiting maximum run time for an application is disclosed. The device includes at least one processing device that is configured to store at least one user preference. The at least one user preference comprises a selection of one or more monitored applications and one or more warning thresholds corresponding to the one or more monitored applications. The one or more warning thresholds comprise a user selected time period. The at least one processing device is configured to obtain time information associated with a use of the one or more monitored applications, wherein the time information is determined according to an accessibility event notifications function, on an operating system of the device. The at least one processing device is further configured to compare the at least one user preference and the obtained time information to determine whether the one or more warning thresholds have been exceeded. Thereafter, the at least one processing device is configured to deliver a notification, upon exceeding the one or more warning thresholds, to the user, and thereby limiting the maximum run time for the application.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION OF THE PREFERRED EMBODIMENT

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
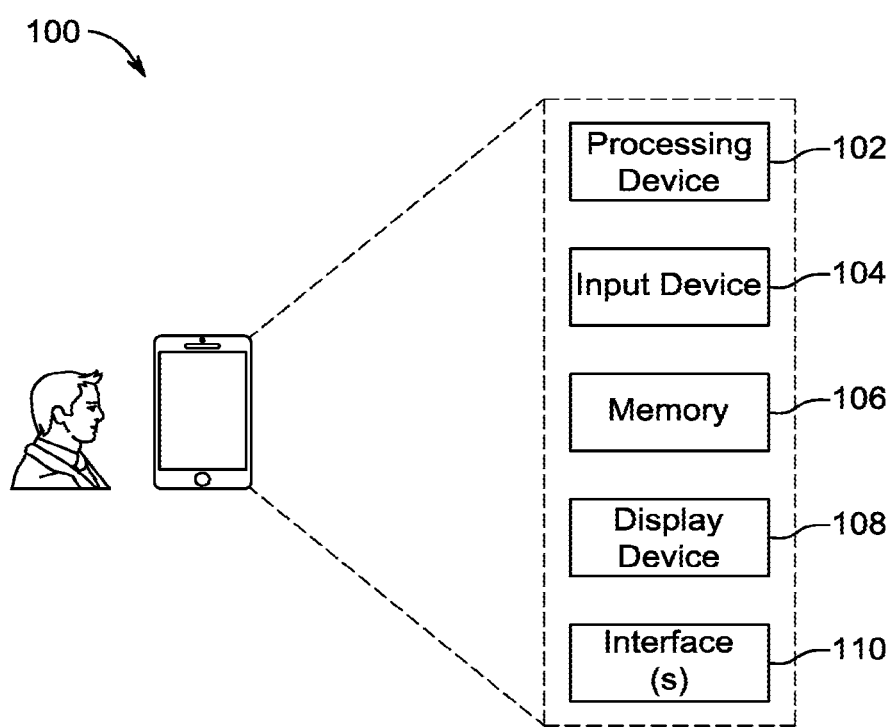
FIG. 1 illustrates a system environment showing a device 100 for limiting maximum run time for an application, in accordance with at least one embodiment.

FIG. 1 illustrates a system environment showing a device 100 for limiting maximum run time for an application, in accordance with at least one embodiment. The device 100 includes at least one processing device 102, an input device 104, a memory 106, a display device 108, and interface(s) 110.

The at least one processing device 102 includes suitable logic, circuitry, and/or interfaces that are operable to execute one or more instructions stored in the memory 106 to perform predetermined operations. The at least one processing device 102 may execute an algorithm stored in the memory 106 for limiting maximum run time for an application. In one embodiment, the at least one processing device 102 may be configured to decode and execute any instructions received from one or more other electronic devices or server(s). The at least one processing device 102 may be configured to execute one or more computer-readable program instructions, such as program instructions to carry out any of the functions described in this description. Further, the at least one processing device 102 may be implemented using one or more processor technologies known in the art. Examples of the at least one processing device 102 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

The input device 104 may comprise suitable logic, circuitry, interfaces, and/or code that may be operable to receive an input from a user. The input may correspond to at least one user preference that includes a selection of one or more monitored applications, a maximum time limit, one or more warning thresholds, and a kill feature corresponding to the one or more monitored applications. In another embodiment, the at least one user preference may include e-mail preferences, application monitoring, analytics, crash reporting, and monitoring preferences. Further, the input device 104 may be operable to communicate with the at least one processing device 102. Examples of the input device 104 may include, but are not limited to, a touch screen and/or a microphone.

The memory 106 stores a set of instructions and data. Further, the memory 106 includes the one or more instructions that are executable by the at least one processing device 102 to perform specific operations. It is apparent to a person with ordinary skill in the art that the one or more instructions stored in the memory 106 enable the hardware of the device 100 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The display device 108 may comprise suitable logic, circuitry, interfaces, and/or code that may be operable to render a graphical user interface. In an embodiment, the display device 108 may display and enable the user to set the at least one preference. The at least one preference may include a selection of one or more monitored applications, a maximum time limit, one or more warning thresholds, and a kill feature corresponding to the one or more monitored applications. In an embodiment, the display device 108 may be a touch screen that enables the user to set the at least one preference. In an embodiment, the touch screen may correspond to at least one of a resistive touch screen, capacitive touch screen, or a thermal touch screen.

The interface(s) 110 may either accept an input from the user or provide an output to the user, or may perform both the actions. The interface(s) 110 may either be a Command Line Interface (CLI), Graphical User Interface (GUI), or a voice interface.

It will be apparent to one skilled in the art that the above-mentioned system components of the device 100 have been provided only for illustration purposes. In another embodiment, the device 100 may include other components such as a comparator, transceiver etc. as well, without departing from the scope of the disclosure.

The operation of the device 100 has been described later in conjunction with FIGS. 2A, 2B, 2C, 2D, 3, 4, 5, 6, 7, 8, and 9.

At first, a user may download a software application onto the device 100. Successively, the user may activate a software application icon present on the device 100. The user may activate the software application icon by clicking. Successively, the user may be prompted to create a profile. The profile may require a password as well as other identifying information. In one embodiment, the user may create multiple profiles for making different timing goals. For example, user A has two different timing profiles, i.e. a first timing profile and a second timing profile. The first timing profile may be used for weekdays, for example controlling access to entertainment applications. The second timing profile may be used for weekends, for example controlling access to work applications such as e-mail. The multiple profiles may allow the user to quickly change the pre-set monitoring based at least on a day of the week, time of day, or at least one user preference. It should be noted that the profile and the multiple profiles may be stored in the memory 106 of the device 100.

Figure 2A:
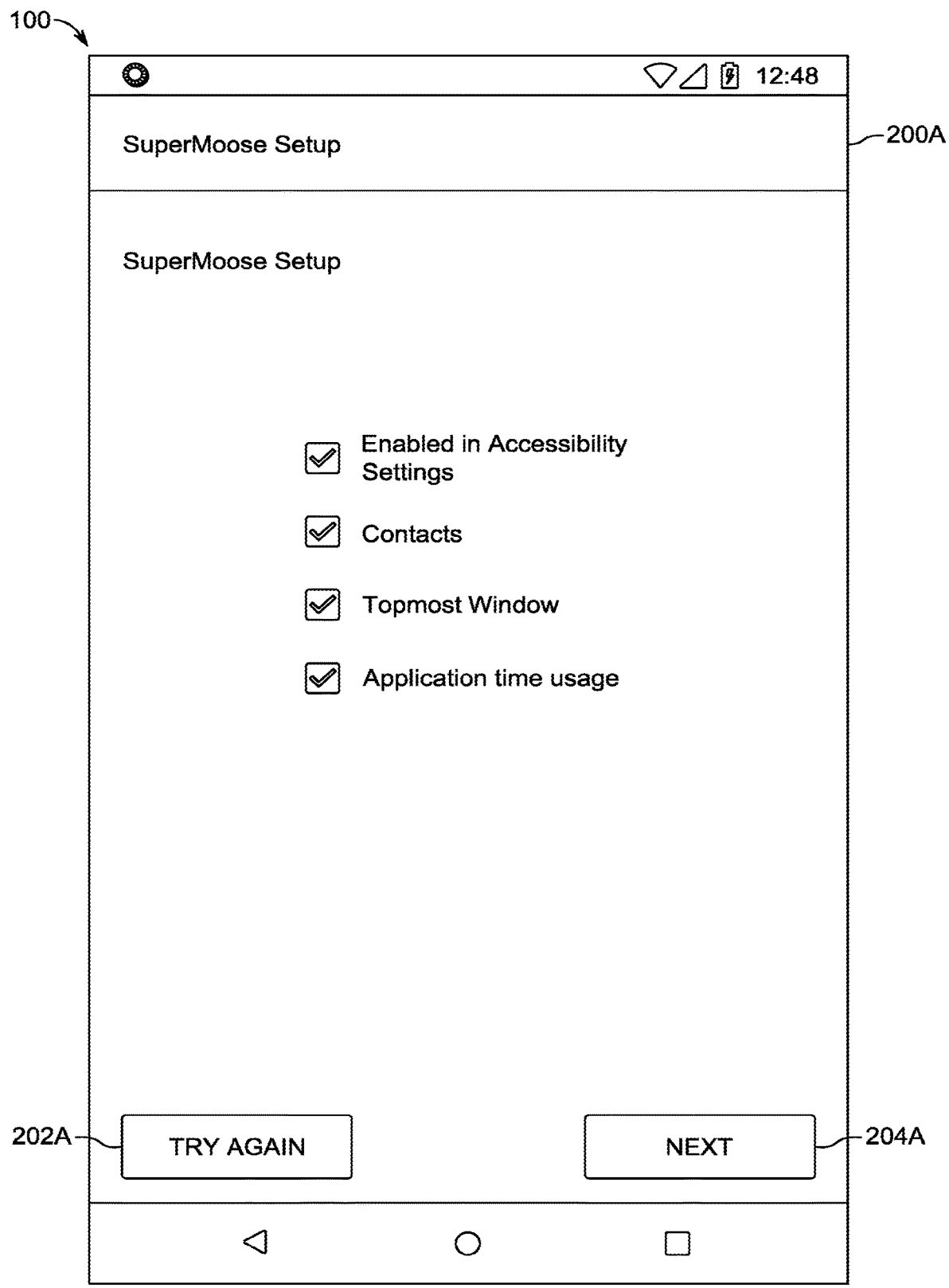
FIG. 2A illustrates the device 100 showing a SuperMoose Setup window 200A of a software application, in accordance with at least one embodiment.
Figure 2B:
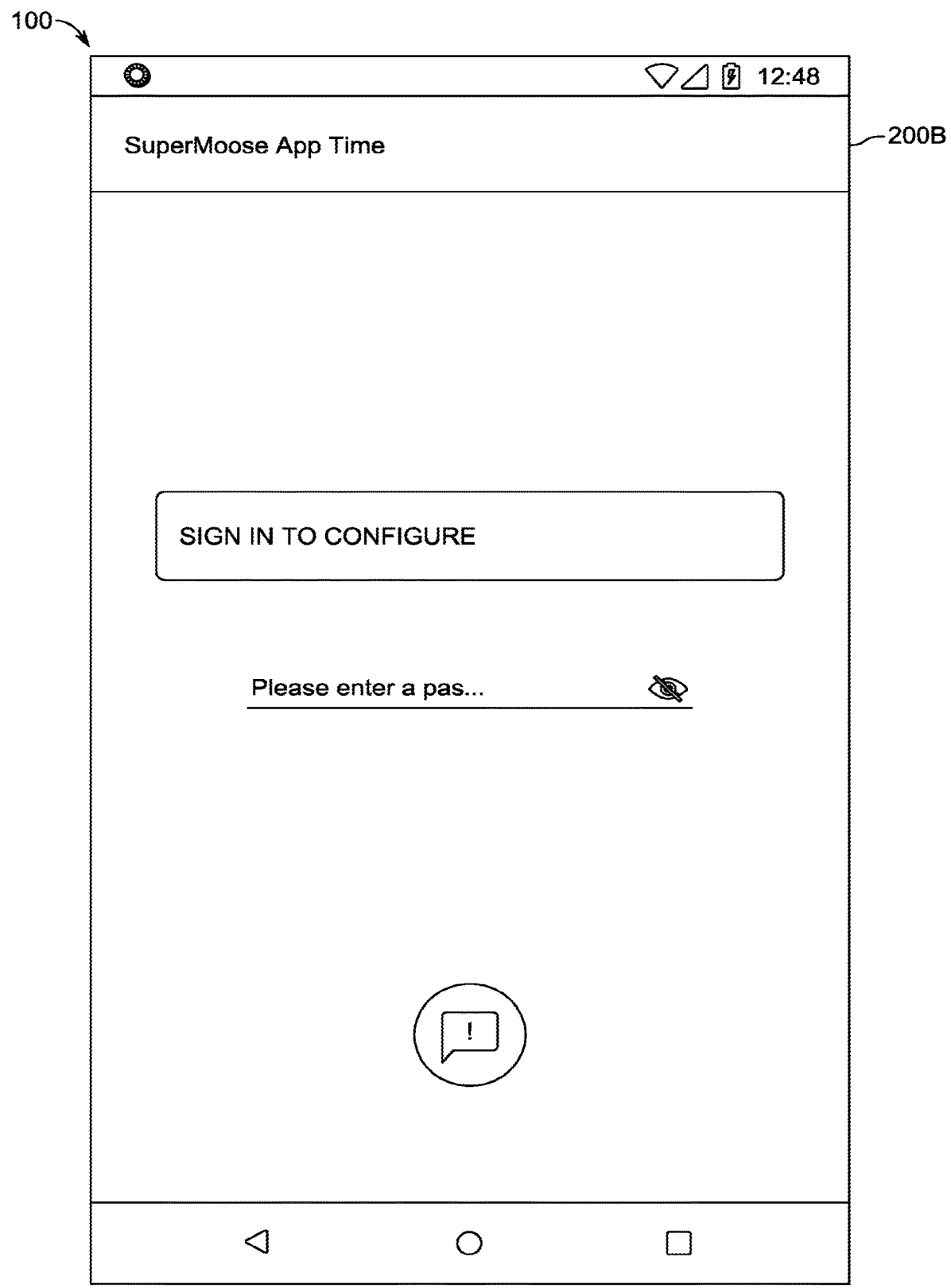
FIG. 2B illustrates the device 100 showing a login window 200B of the software application, in accordance with at least one embodiment.

In one embodiment, the user may be asked to select one or more settings using a SuperMoose Setup window 200A, as shown in FIG. 2A. The one or more settings may include, but are not limited to, enabled in Accessibility Settings, Contacts, Topmost window, and Application time usage. Further, the SuperMoose Setup window 200A may include "TRY AGAIN" button 202A and "NEXT" button 204A. The "TRY AGAIN" button 202A may be used to restart the SuperMoose setup process. The "NEXT" button 204A may be used to proceed to a next step. It should be noted that the SuperMoose Setup window 200A may correspond to a permission status window. Successively, the user may be asked to login to the software application using a login window 200B, as shown in FIG. 2B. In one embodiment, the user may login to an account or a profile in the cloud. In another embodiment, the user may not be required to login, or, alternatively, profiles may be stored in the software application such that the login is only required occasionally, or once. In one embodiment, additional profiles may be stored in the memory 106 for parental controls. For example, when a parent hands the device 100 to a child, the parent may quickly enable the additional profile with settings specific to the chosen parental controls.

Further, the login feature may establish a level of security in order to prevent unwanted or unauthorized disablement. It should be noted that the parent may establish a password-protected profile, or the profile may require a secondary key (i.e. a master password) in order to alter settings of the profile. Once logged in by the user, a secondary key may be used to alter the settings of the profile. The secondary key may be much shorter, for example 4 to 6 digits. In another embodiment, the device 100 integrated with biometric scanners, may be used to control login and unlocking setting control. It will be apparent to one skilled in the art that above-mentioned login feature and the profile embodiments have been provided only for illustration purposes, without departing from the scope of the disclosure.

Successively, at least one user preference may be received from the user. The at least one user preference may include, but are not limited to, a selection of one or more monitored applications, one or more warning thresholds, a maximum time limit, and a kill feature corresponding to the one or more monitored applications. The one or more warning thresholds may include a user selected time period. In another embodiment, the at least one user preference may include e-mail preferences, application monitoring, analytics, crash reporting, and monitoring preferences. It should be noted that the user may select the warning threshold and the maximum time limit, for each independent application that is being selected by the user for monitoring.

Figure 2C:
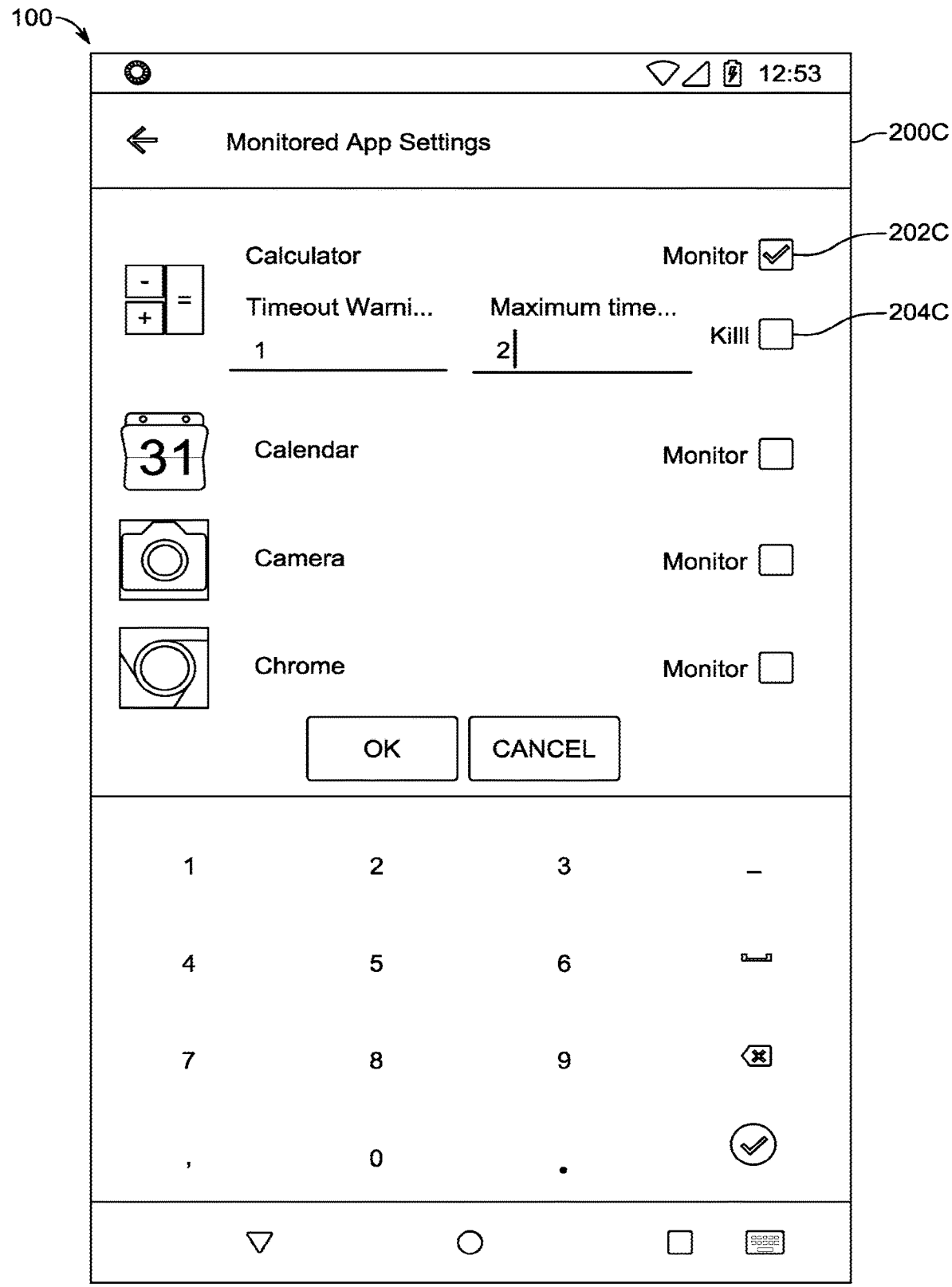
FIG. 2C illustrates the device 100 showing Monitored App Settings window 200C of the software application, in accordance with at least one embodiment.

As shown in FIG. 2C, the one or more monitored applications may correspond to applications selected by the user for monitoring. The application selected in the Monitored App Settings window 200C is called a monitored application. For example, the user selects a Calculator App for monitoring by selecting a checkbox 202C. Further, the user selects a warning threshold (i.e. a warning time limit) as 1 hour and a maximum time limit as 2 hours. In one embodiment, when the warning threshold and the maximum time limit are selected, and not monitored, and the user desires to reestablish monitoring, then the user may select the checkbox 202C and previous warning threshold and the maximum time limit self-populate. In another embodiment, the one or more monitored applications may offer suggested warning thresholds and maximum time limits based on observed usage or preselected productivity plans.

Further, as shown in FIG. 2C, the user may select the kill feature in the Monitored App Settings window 200C. The kill feature may kill the one or more monitored applications when the maximum time limit has been reached. In one example, the parent may wish to prevent the child from spending more than a specific number of hours on the use of the monitored application. In such type of scenario, the parent may select the kill feature. The kill feature may be enabled by selecting a "kill" checkbox 204C.

Successively, time information associated with a use of the one or more monitored applications may be obtained. The time information may be determined according to an accessibility event notifications function, on an operating system of the device 100. Further, the usage of the one or more monitored applications may be monitored based at least on one or more time frames. In one case, the one or more time frames may be hourly, daily, or weekly limits. In one embodiment, the usage of the monitored application may be based on daily limits and may be accomplished, for example, by listening for time changes, time zone changes, and date changes.

In one embodiment, the usage of the monitored application across multiple devices may be checked with a server, or even directly with other monitored devices, and thereafter sum the total time used against the user. For example, a user has a limit of two hours of Minecraft across all devices per day. The user plays 45 minutes of Minecraft on an Android phone, 45 minutes on a Windows PC, and then switches to an X-Box One X. The monitored application may be blocked across the multiple devices at the two-hour time limit per day across the multiple devices, provided the multiple devices may either talk to each other, or talk through the server.

It should be noted that the monitored applications may be organized into groups, such as games and homework. Further, time limits may be set for a group. When the sum of time used by the one or more monitored applications within the group across the multiple devices is reached, any monitored application within the group may be blocked across the multiple devices. The detailed description of blocking the one or more monitored applications will be described later in conjunction with FIG. 3. In one embodiment, more time may be requested by using an e-mail or a Short Message Service (SMS) message.

Successively, the at least one user preference and the obtained time information are compared to determine whether the one or more warning thresholds have been exceeded. Thereafter, a notification is delivered to the user, upon exceeding the one or more warning thresholds. The notification may alert the user that the user is within a selected amount of time from the maximum time limit established by the user. When the maximum time limit has been reached, the one or more monitored applications may be closed, or the user may be further prompted or notified that the user has reached the maximum time limit.

In one case, when the kill feature is enabled, the one or more monitored applications may be killed after reaching the maximum time limit. In another case, a notification may appear, for example, a warning alerting the user that the monitored application will be killed after 1-minute. It should be noted that the warning may give the user time to save any work or a game, prior to the monitored application being terminated or killed. The detailed description of killing the one or more monitored applications will be described later in conjunction with FIG. 4.

In another embodiment, if the monitored application is relaunched after being killed, or the user presses a back button or swipes away, then a maximum time limit window may appear after a grace period of 15-seconds. The grace period may give the user a chance to get rid of the monitored application. Therefore, the user may have an option of dismissing the maximum time limit window for the rest of the day, as well as being reminded again. The reminder may occur sometime in the future at the difference of the maximum time limit and the warning threshold minutes relative to system boot. Such method may provide repeated reminders, without, depending on selections and/or killing the application completely.

In one embodiment, when the monitored application's time is expired, a window (i.e. a warning threshold window or the maximum time limit window) may appear. Further, the user may be asked to enable the permission for the window to appear above all other windows. In one case, if the user has enabled the permission, the timed-out window may be created with proper attributes. For example, a user is playing a game and has enabled appropriate permissions, then the window will appear in front of the game.

In another embodiment, when the user enables the kill feature, then another window pops up after dismissing the maximum time limit window. Such window pop ups may indicate to the user, for example, 1 minute to shut down the monitored application. It should be noted that a specific time frame may be adjustable. In another case, when the alarm is set for one minute in the future relative to the time the device 100 booted. In another case, when the timer is up, the one or more monitored applications except for the monitored application still running, may be moved to background. It should be noted that Android allows background applications to be killed by another application.

In another embodiment, the alarm may be set to fire at midnight. When midnight occurs, foreground application notifications may be blocked and all timing information and state information for all the monitored applications may be reset and saved. Thereafter, the foreground application notifications may be unblocked. For example, the user has a 1-hour/day limit on playing Minecraft, the user plays the game from 11:30 pm to 1 am. In another example, the user plays Minecraft only between 5 pm and 8 pm, but also be limited to no more than 1 hour of playtime. It should be noted that atomic clocks on the internet may be used, and may check whether the user is in the system's time zone. Thus, such system may check for an unusual amount of time changes within a time period, which may suggest the user's attempt to bypass the time limits. The detailed description related to midnight detection will be described later in conjunction with FIG. 5.

As discussed above, when the SuperMoose Setup window 200A is launched, the accessibility service may be either disabled or enabled. During the boot of the device 100, the accessibility service may be initialized by the Android and may start tracking the one or more monitored applications. In one embodiment, the accessibility service may be explicitly activated by the user. In another embodiment, the accessibility service may be automatically enabled upon boot up. In one case of the automatic activation, the user may press "START AS CONFIGURED" button in order to trigger a notification which explains the pros and cons of starting the accessibility service. Thereafter, the notification may guide the user to activate the accessibility service.

In one case, if the user enables the accessibility service, then onStartCommand( ) function may be called. The onStartCommand( ) function may determine what applications are running, blocks the foreground application notifications, merges the timing information and the state information for what the monitored applications are currently executing with the updated selections from the user, and finally unblocks the foreground application notifications. Such example is of a "hot start" code path. The "hot start" code path may be called when the user clicks "OK" button on the Monitored App Settings window 200C, as shown in FIG. 2C. The detailed description of the "hot start" code path will be described later in conjunction with FIG. 6.

A description of the algorithm and code enabling an embodiment of the present invention is described below:

Part A
1) Set the BIND_ACCESSIBILITY_SERVICE permission.
2) Create the skeleton for an android accessibility service.
3) Create an accessibility service configuration with typeWindow StateChanged and feedbackAllMask.
4) In onAccessibilityEvent, switch on AccessibilityEvent. TYPE_WINDOW_STATE_CHANGED.

5) For non-null event. source's in onWindow State Changed, match event.source.packagename.
6) Wrap an AccesibilityNodeInfoCompat around event.source for backwards compatibility.
7) Start a loop for all the applications that are being monitored.
8) Check to see if event.source.packagename equals the monitored applications packagename.
9) Check to see if AccessibilityNodeInfoCompat.isVisible ToUser is checked.
10) If step 9 succeeds, create a new alarm from the Alarm Manager that is set to fire when the remaining time of the monitored application expires.
11) If steps 8 or 9 fail:
    a. Cancel the alarm for the app that is being iterated upon.

Figure 2D:
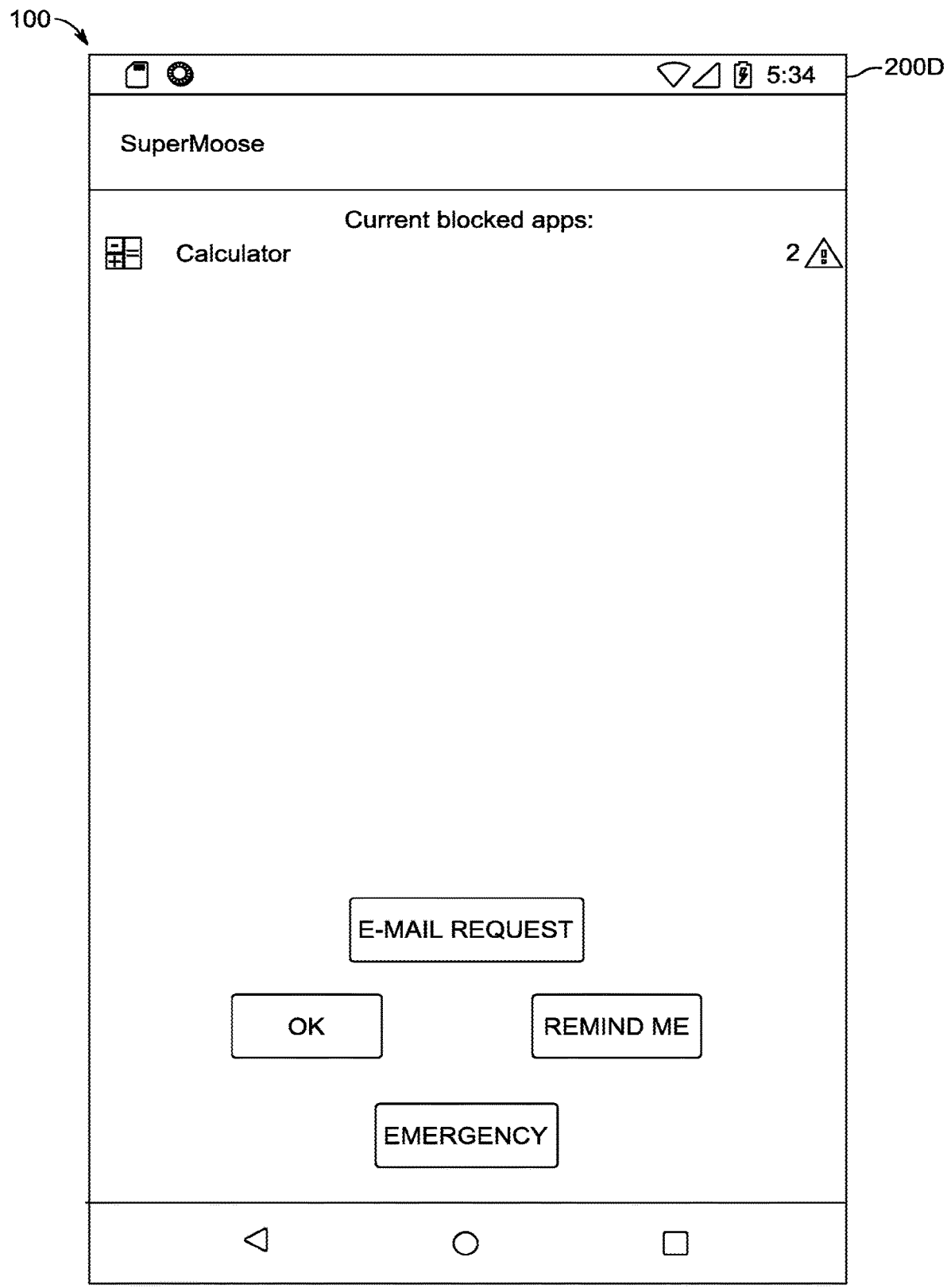
FIG. 2D illustrates the device 100 showing a SuperMoose window 200D, in accordance with at least one embodiment.

Part B
1) Register broadcast receivers for ACTION_SCREEN_ON and ACTION_SCREEN_OFF
2) When ACTION_SCREEN_ON occurs: For each application that is being monitored
    a. check to see if it is in the timing paused state
    b. If in the timing paused state, then
        i. Clear the timing paused state
        ii. Start an alarm for the time that the application has left to run.
2) When ACTION_SCREEN_OFF occurs: For each application that is being monitored:
    a. Check to see if the application is being actively timed
    b. If it is being actively timed, then
        i. Cancel the alarm
        ii. Set the state to timing paused As shown in FIG. 2D, a SuperMoose window 200D may show current blocked apps. In an example, a Calculator App is being displayed. Further, the SuperMoose window 200D may show one or more tabs such as an email request tab, OK tab, Remind Me tab, and Emergency tab. It should be noted that various functionalities of the present invention may be off by default, due to various reasons, such as potential security issues. The user may explicitly enable functionality for the present invention. The functionality may be called a permission. Further, embodiments of the present invention may detect what permissions are off and, via a notification or dialog box, ask the user to enable the permissions. Further, if the user chooses to enable the permission, embodiments of the present invention may guide the user to a correct place in a settings application.

It should be noted that Android may provide two mechanisms that make long-term timing feasible, i.e. a broadcast receiver and services. The broadcast receiver may be an application provided function that works when a system broadcast (event) occurs. For example, the one or more monitored applications may be gone when the broadcast receiver is called. Further, a code may be required to execute a loaded function. Thereafter, the one or more monitored applications may perform work beyond the life of the one or more monitored applications, and thus may result in increasing stability, reliance of the one or more monitored applications, and may provide high levels of accuracy in long-term timing. It should be noted that preferred embodiments of the present invention may be based on the broadcast receivers called from Android's alarm manager. Further, the preferred embodiments may use Android's alarm clock for determining how long an application has been executing, without departing from the scope of the disclosure.

In another embodiment, the one or more monitored applications may determine whether an application may be executed by traversing a /proc file system. The /proc file system may include files comprising a name and status information of currently executing programs on LINUX and UNIX based operating systems, such as Android. Further, the at least one processing device 102 may detect when the application is interactable and not interactable. The interactable means that the user can interact with the application, i.e. the application is not disabled. It should be noted that the application may be running in some form or another with the screen powered off i.e. one or more monitored applications may be visible to the user in the foreground, but not interactable. On the other hand, "disabled" means that a setting has been set which prevents the application from launching. In another embodiment, the one or more monitored applications may be made interactable by using two facilities.

In a scenario, when a program is covered by the one or more monitored applications, or is minimized on an Android operating system, then the program may stop executing. Further, the one or more monitored applications may have gone to the background. Further, the Android may provide ability for the program to continue executing in the background through the services. It should be noted that the service is the program that does not have a user interface and is thus invisible to the user. In one embodiment, accessibility services in Android may use application provided accessibility services. The accessibility services may correspond to assistance for people with disabilities. Further, the accessibility services may be notified from Android of any window that transitions to the foreground. Such notification may include information such as a package name and whether or not the monitored application is interactable.

In one embodiment, the timing information and state information for the monitored application may be tracked. Based at least on the tracking, the at least one processing device 102 may determine that the application is running in the foreground. Successively, the at least one processing device 102 may determine whether the monitored application is being tracked via the package name and is interactable. Based at least on the determination, the at least one processing device 102 may request a future system broadcast occur from the Android alarm manager relative to when the device 100 first booted. Thereafter, the timing information and the state information for the monitored application may be saved. Such method may be used for timing like an alarm clock that is started as soon as the monitored application became interactable, given how much time had passed from previous timings. Further, the timing is set relative to when the system booted and time changes are of no consequence.

In another embodiment, during search of the one or more monitored applications in response to a foreground notification, if the monitored application is found and in an active timing state, but the package name does not match the monitored application described by the foreground notification, then the alarm for the monitored application may be canceled. Thereafter, updated timing information and state information may be written to the memory 106 of the device 100 and thus the monitored application may have gone to the background and may be non-interactable. Further, the timings of the monitored application may be checked to see whether the monitored application has been timed out. In this case, if the monitored application is in the warning timeout state and is at or has exceeded the warning timeout limit i.e. warning thresholds, then the at least one processing device 102 may notify the user that the warning timeout limit has been reached. Otherwise, if the monitored application is in the time's up state and the time's up limit has been reached or exceeded, then the at least one processing device 102 may block the monitored application.

In another scenario, the at least one processing device 102 may check perform some activity that affects whether the monitored application is interactable, then the Android system broadcasts about the interactability of a screen. Upon resumption of timing of the monitored application, if the timings are in a timeout state, then the user may be guided to the notification or blocking of the monitored application given the timeout condition that the monitored application is in. In further scenarios, updated timings are recorded when the monitored application is no longer interactable. When the monitored application goes from non-interactable to interactable, a timeout condition can be displayed. The program may continue to execute while the screen may be non-interactable. Further, the Android system may broadcast for the screen becoming interactable and non-interactable. When the screen becomes interactable, then the alarms may be set for the one or more monitored applications being interactable from where the one or more monitored applications last left off. Thereafter, the timing information and the state information may be saved. The detailed description related to a method for detecting interactable screen will be described later in conjunction with FIG. 7.

In another case, when the screen is non-interactable, then the alarms for the one or more monitored applications may be cleared. Thereafter, the timing information and the state information may be saved. The detailed description related to a method for detecting a non-interactable screen will be described later in conjunction with FIG. 8. In one embodiment, the timing information and the state information may be saved locally, in the memory 106 of the device 100. In another embodiment, the timing information and the state information may be stored at a decentralized location such as cloud storage. The cloud storage may be used as a backup, when the locally stored information is unavailable.

In one case, when the application is usable, a timer whose lifetime bound to the operating system is started. In another case, when the application is no longer usable, then the timer is stopped, and the timing information and the state information are saved. Further, an additional check may be made to see if the application has timed out, in case the timer has not fired. In another case, if the timer has fired, or the application is out of time, then the monitored application is out of time. Thereafter, the monitored application is blocked by displaying a topmost window.

Figure 3:
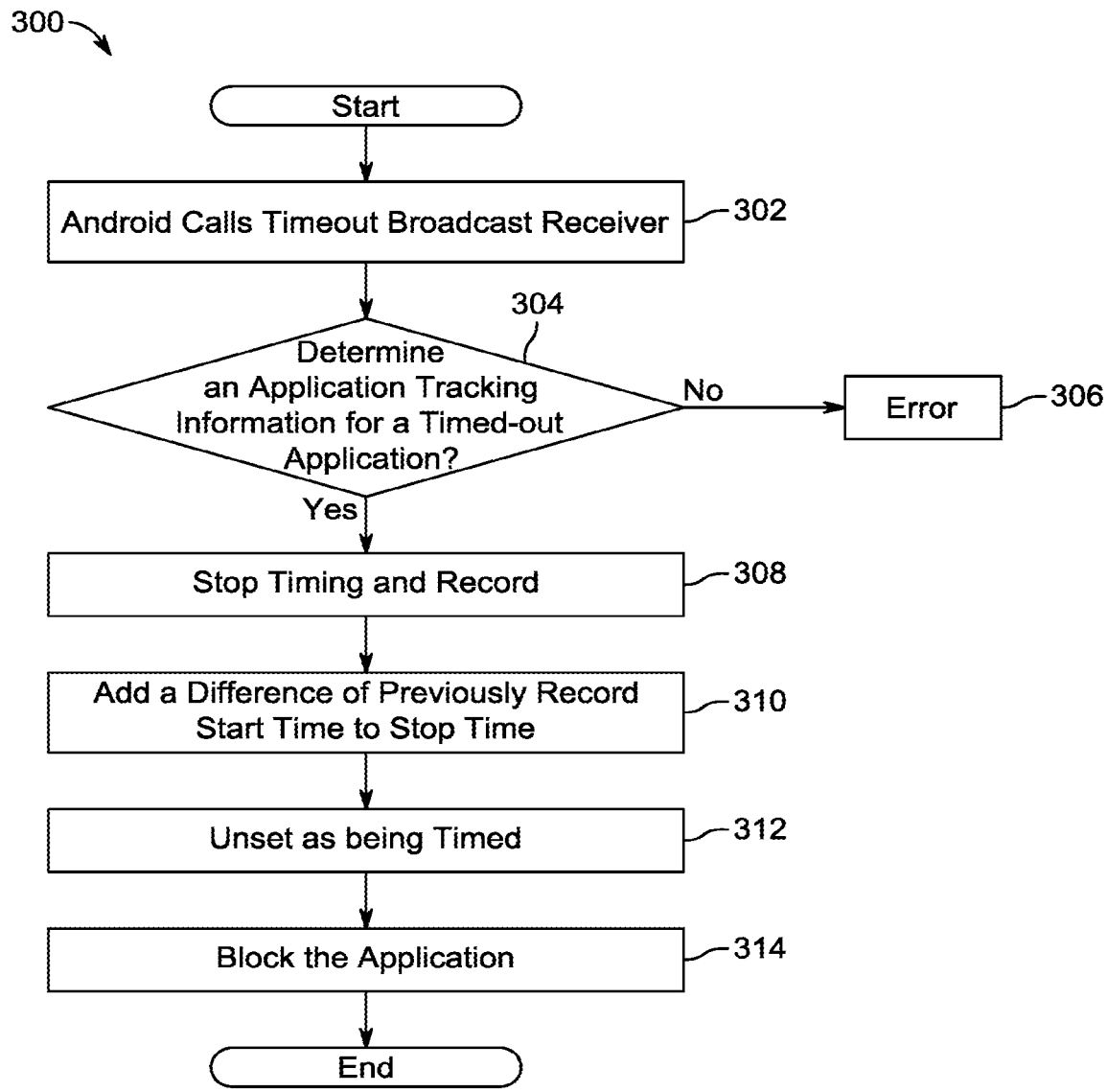
FIG. 3 is a flowchart 300 illustrating a method for blocking an application, in accordance with at least one embodiment.

FIG. 3 is a flowchart 300 illustrating a method for blocking an application, in accordance with at least one embodiment. The flowchart 300 is described in conjunction with FIGS. 1, 2A, 2B, 2C, and 2D.

At step 302, Android calls the timeout broadcast receiver. At step 304, an application tracking information for a timed-out application is determined. In one case, if the application tracking information is not determined, then there is an error, at step 306. In another case, if the application tracking information is determined, then the at least one processing device 102 may stop timing and record (i.e. information), at step 308.

At step 310, a difference of previously recorded start time is added to stop time. It should be noted that the start time and the stop time may correspond to the one or more monitored applications.

At step 312, the application is unset as being timed. At step 314, the application is blocked. It should be noted that the at least one processing device 102 may block the application.

Figure 4:
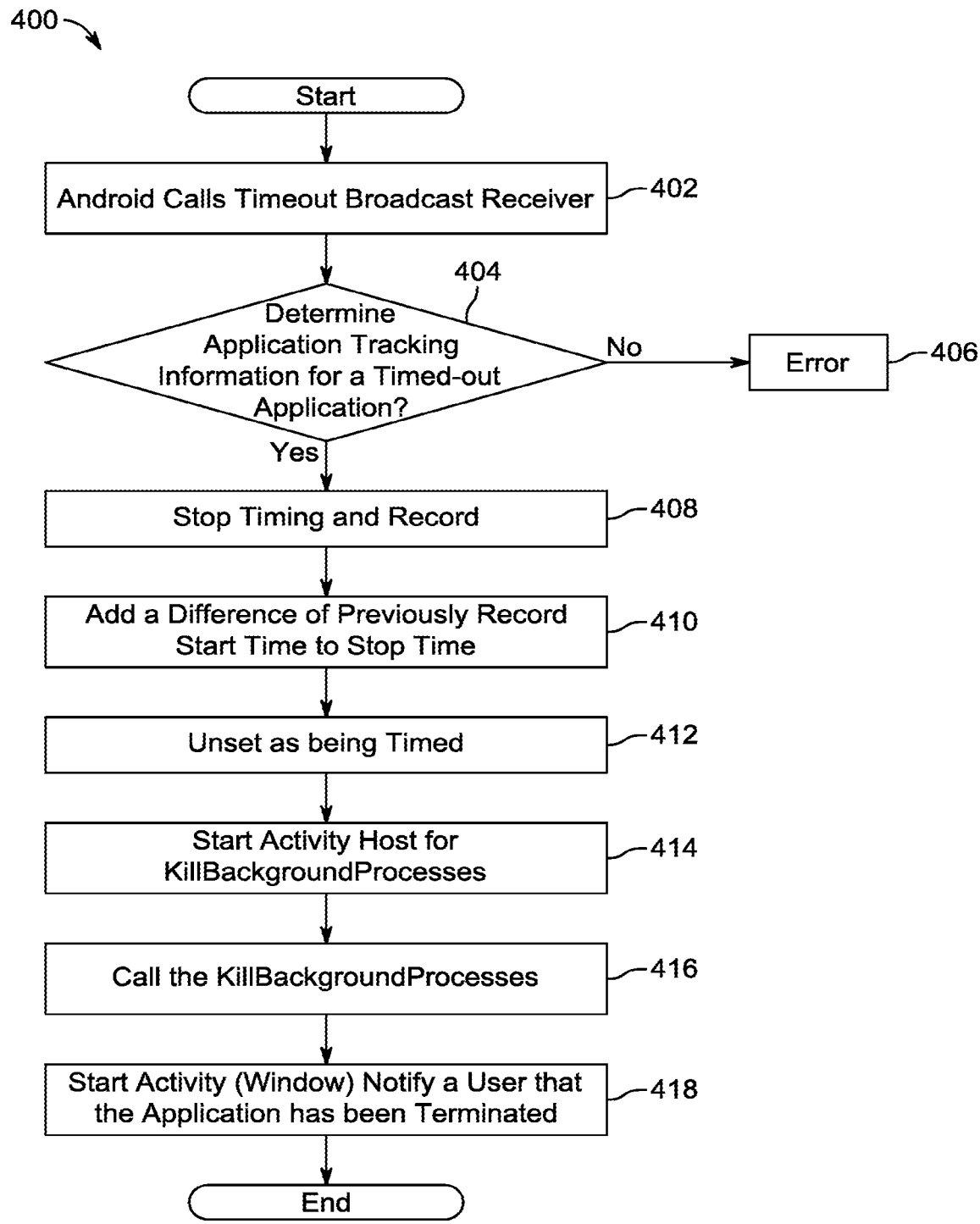
FIG. 4 is a flowchart 400 illustrating a method for killing an application, in accordance with at least one embodiment.

FIG. 4 is a flowchart 400 illustrating a method for killing an application, in accordance with at least one embodiment. The flowchart 400 is described in conjunction with FIGS. 1, 2A, 2B, 2C, and 2D.

At step 402, Android calls the timeout broadcast receiver. At step 404, an application tracking information for a timed-out application is determined. In one case, if the application tracking information is not determined, then there is an error, at step 406. In another case, if the application tracking information is determined, then the at least one processing device 102 may stop timing and record (information), at step 408.

At step 410, a difference of previously recorded start time is added to stop time. It should be noted that the start time and the stop time may correspond to the one or more monitored applications.

At step 412, the application is unset as being timed. At step 414, an activity host for killBackgroundProcesses is started. At step 416, the killBackgroundProcesses is called. At step 418, an activity (window) is started that notifies a user that the application has been terminated.

Figure 5:
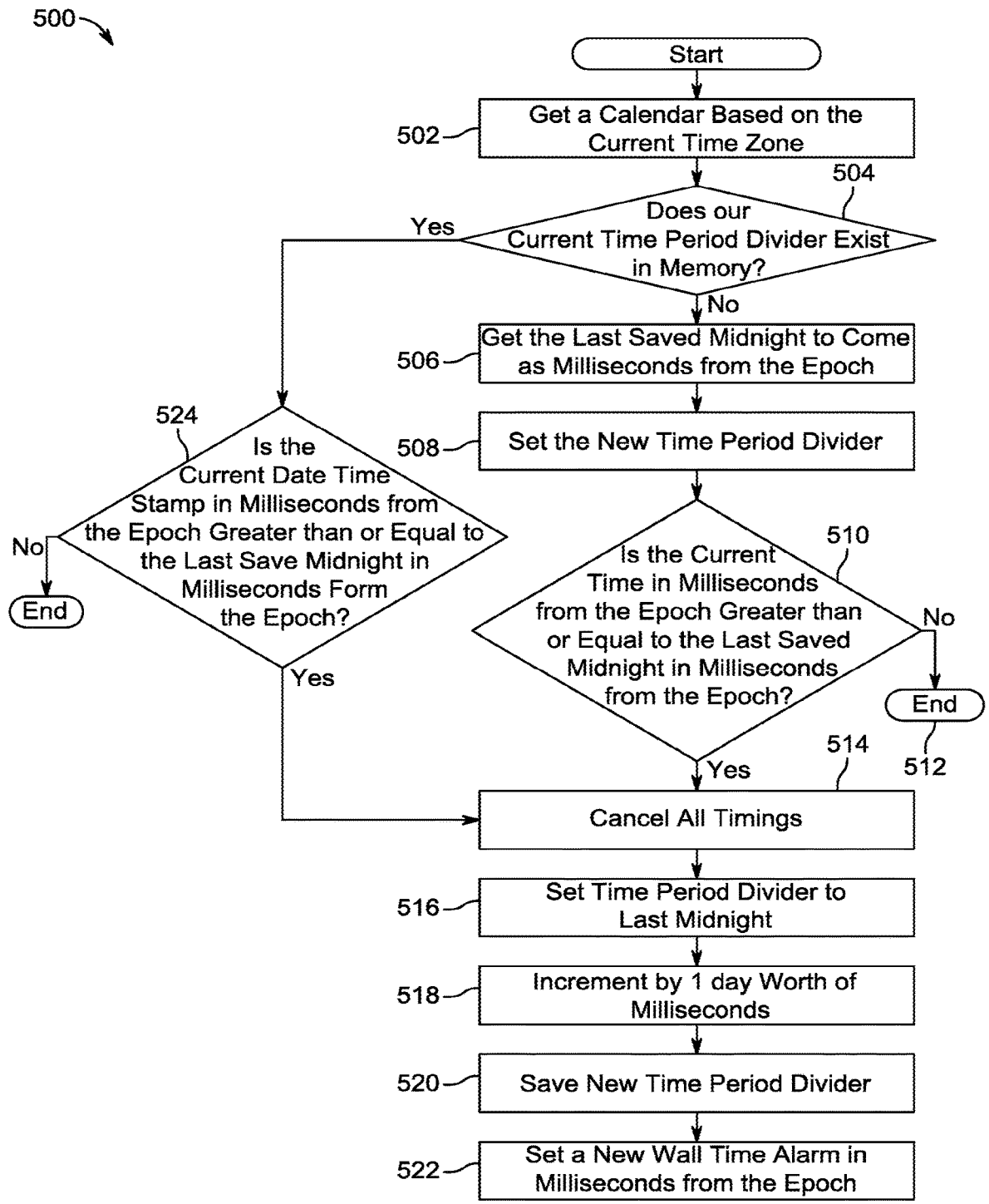
FIG. 5 is a flowchart 500 illustrating a method for midnight detection, in accordance with at least one embodiment.

FIG. 5 is a flowchart 500 illustrating a method for midnight detection, in accordance with at least one embodiment. The flowchart 500 is described in conjunction with FIGS. 1, 2A, 2B, 2C, and 2D.

At first, a calendar based on a current time zone is acquired, at step 502. Successively, if it is determined that a current time period divider exists in the memory 106, at step 504. Based at least on the determination, if the current time period divider does not exist in the memory 106, then the last saved midnight to come as milliseconds from the epoch is retrieved, at step 506. Successively, a new time period divider is set, at step 508. Successively, the at least one processing device 102 may determine whether the current time in milliseconds from the epoch is greater than or equal to the last saved midnight in milliseconds from the epoch, at step 510. In one case, if the current time in milliseconds from the epoch is not greater than or equal to the last saved midnight in milliseconds from the epoch, then the at least one processing device 102 may end the process, at step 512. In another case, if the current time in milliseconds from the epoch is greater than or equal to the last saved midnight in milliseconds from the epoch, then all timings are canceled, at step 514.

Successively, the time period divider is set to last midnight, at step 516. Successively, the at least one processing device 102 may increment time by 1-day worth of milliseconds, at step 518. Successively, a new time period divider is set, at step 520. Thereafter, a new wall time alarm in milliseconds from the epoch is set, at step 522. As discussed above at step 504, if the current time period divider exists in the memory 106, then the at least one processing device 102 may determine whether the current date time stamp in milliseconds from the epoch greater than or equal to the last saved midnight in milliseconds from the epoch, at step 524. If the current date time stamp in milliseconds from the epoch is greater than or equal to the last saved midnight in milliseconds from the epoch, then the method follows the step 514. Otherwise, if the current date time stamp in milliseconds from the epoch is not greater than or equal to the last saved midnight in milliseconds from the epoch, then the at least one processing device 102 may end the process.

Figure 6:
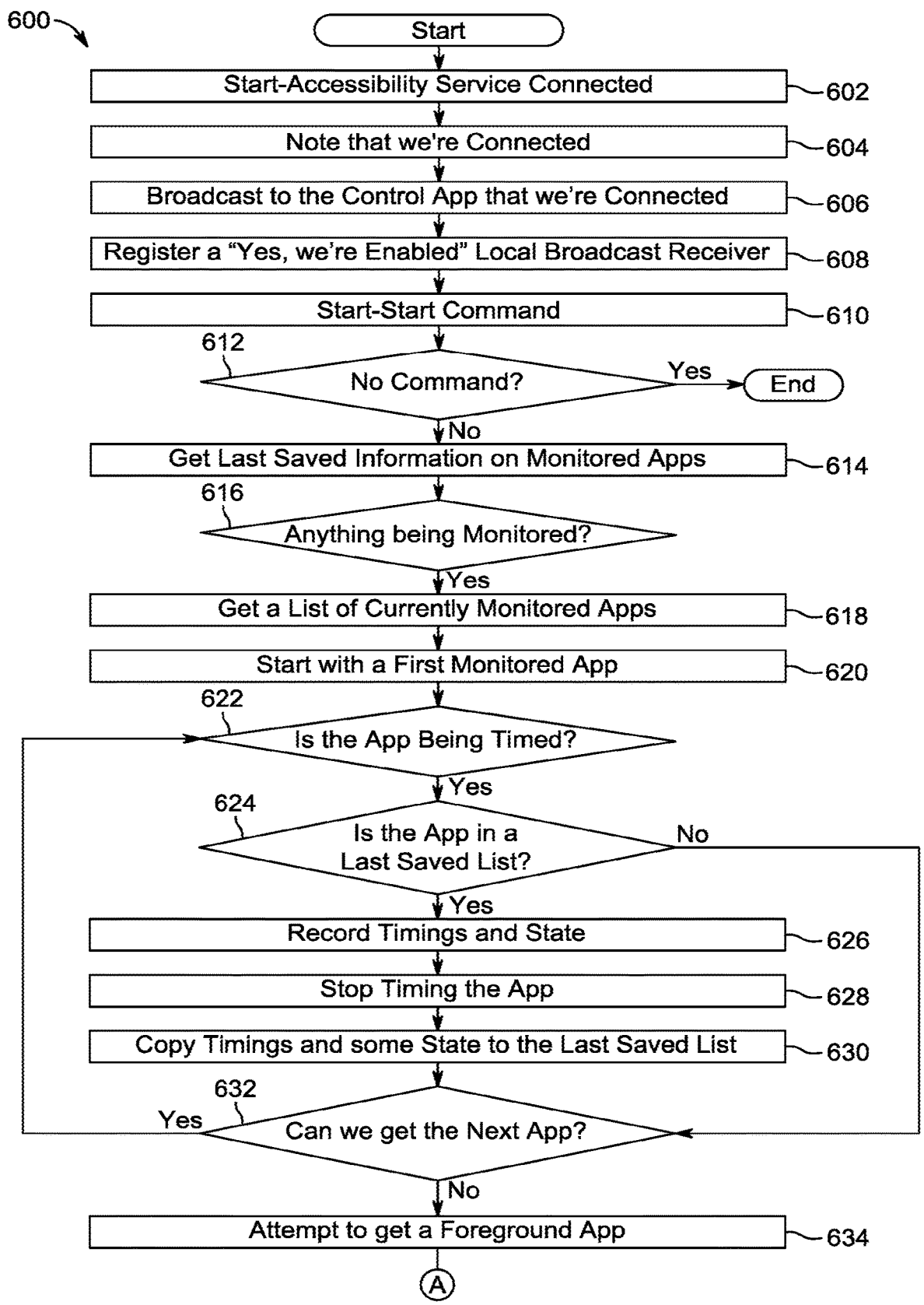
FIG. 6 is a flowchart 600 illustrating a method related to a hot start code path, in accordance with at least one embodiment.
Figure 6:
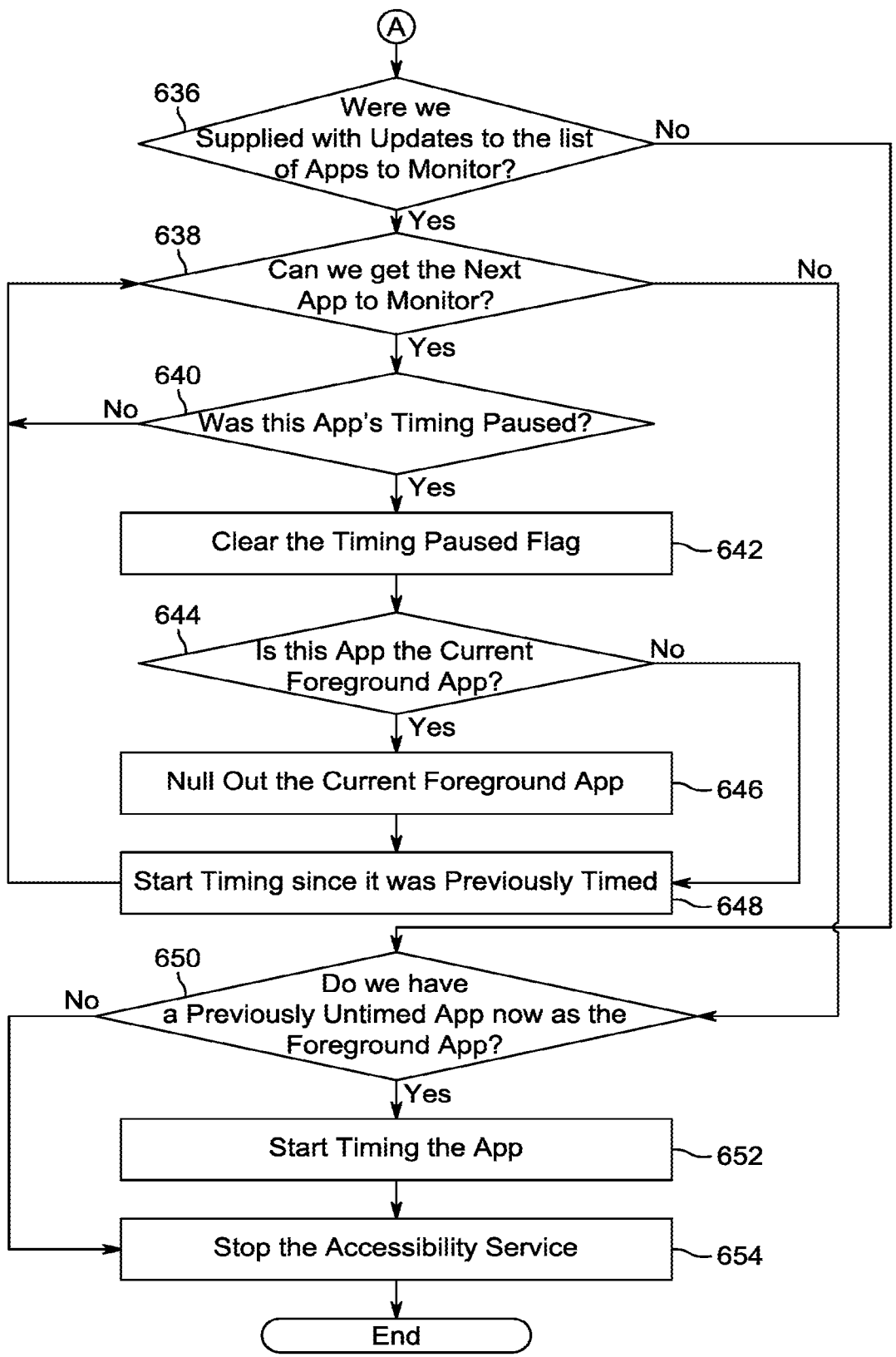

FIG. 6 is a flowchart 600 illustrating a method related to a hot start code path, in accordance with at least one embodiment. The flowchart 600 is described in conjunction with FIGS. 1, 2A, 2B, 2C, and 2D.

Initially, an accessibility service connected is started, at step 602. Successively, the at least one processing device 102 may note that "we're connected", at step 604. The at least one processing device 102 may broadcast to the control application that "we're connected", at step 606. The at least one processing device 102 may then register a "yes, we're enabled" to the local broadcast receiver, at step 608. Successively, the at least one processing device 102 may start StartCommand, at step 610. At which time the at least one processing device 102 may determine whether there is a command, at step 612. In one case, if there is no command, then the at least one processing device 102 may end the process. In another case, if there is a command, then the at least one processing device 102 may get last saved information on the monitored applications, at step 614.

Successively, the at least one processing device 102 may determine whether anything is being monitored, at step 616. Based at least on the determination, the at least one processing device 102 may get a list of currently monitored applications, at step 618. Successively, the at least one processing device 102 may start with a first monitored application, at step 620. Successively, the at least one processing device 102 may determine whether the application (App) is being timed, at step 622. If the application is being timed, then the at least one processing device 102 may determine whether the application is present in a last saved list, at step 624. In one case, if the application is present in the last saved list, then the at least one processing device 102 may record timings state, at step 626. Successively, the at least one processing device 102 may stop timing the application, at step 628. Successively, the at least one processing device 102 may copy timings and some state to the last saved list, at step 630.

Successively, the at least one processing device 102 may determine whether a next application can be acquired, at step 632. In one case, if the next application can be acquired, then the method follows the step 622. In another case, if the next application cannot be acquired, then the at least one processing device 102 may attempt to get a foreground application, at step 634. In another embodiment, if the application is not present in the last saved list, then the method follows the step 632.

Successively, the at least one processing device 102 may determine whether we were supplied with updates to the list of applications to monitor, at step 636. If we were supplied with the updates to the list of applications to monitor, then the at least one processing device 102 may determine whether a next application can be acquired to monitor, at step 638. If the next application can be acquired to monitor, then the at least one processing device 102 may determine whether the app's timing was paused, at step 640. If the app's timing was not paused, then the method follows the step 638. Otherwise, the at least one processing device 102 may clear the timing paused flag, at step 642.

Successively, the at least one processing device 102 may determine whether the application is a current foreground application (App), at step 644. If the application is the current foreground App, then the at least one processing device 102 may null out the current foreground App, at step 646. Successively, the at least one processing device 102 may start timing since it was previously timed, at step 648. Thereafter, the method follows the step 638. In another case, if the application is not the current foreground App, then the method directly follows the step 648.

In one embodiment, if we were not supplied with the updates to the list of applications to monitor, then the at least one processing device 102 may determine whether we have previously untimed app now as the foreground application, at step 650. Based at least on the determination, if we have the previously untimed app now as the foreground application, then the at least one processing device 102 may start timing the app, at step 652. Thereafter, the at least one processing device 102 may stop the accessibility service, at step 654. In another case, if we do not have the previously untimed app now as the foreground application, then the at least one processing device 102 may stop the accessibility service, at step 654. As discussed above at step 638, if the next application cannot be acquired to monitor, the method follows the step 648.

Figure 7:
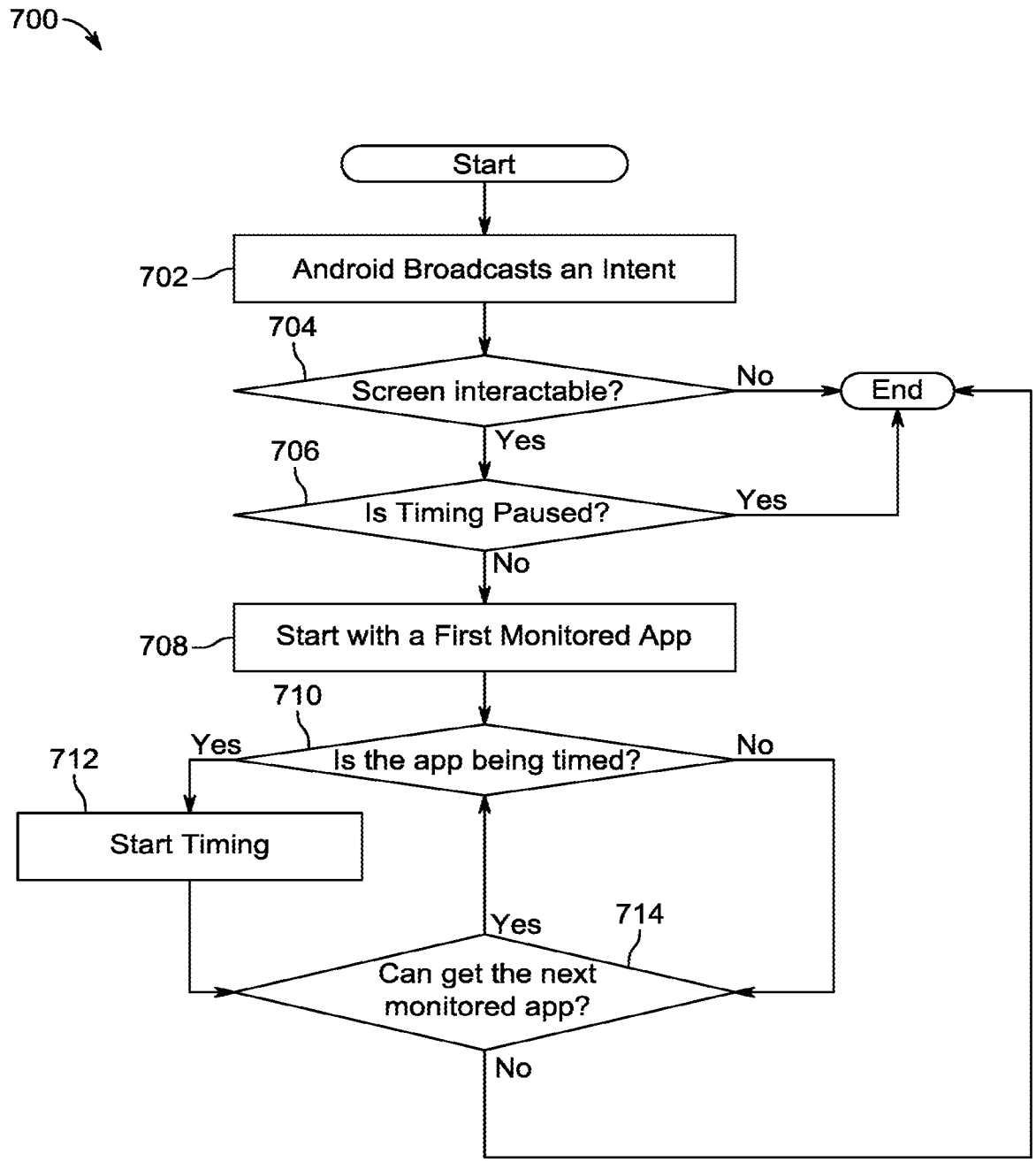
FIG. 7 is a flowchart 700 illustrating a method for detecting interactable screen, in accordance with at least one embodiment.

FIG. 7 is a flowchart 700 illustrating a method for detecting interactable screen, in accordance with at least one embodiment. The flowchart 700 is described in conjunction with FIGS. 1, 2A, 2B, 2C, and 2D.

At first, Android broadcasts an intent, at step 702. Successively, the at least one processing device 102 may determine whether a screen is interactable, at step 704. In one case, if the screen is not interactable, then the at least one processing device 102 may end the process. In another case, if the screen is interactable, then the at least one processing device 102 may determine whether timing is paused, at step 706. Based at least on the determination, if the timing is paused, then the at least one processing device 102 may end the process. Otherwise if the timing is not paused, then the at least one processing device 102 may start with a first monitored application, at step 708. Successively, the at least one processing device 102 may determine whether the application (App) is being timed, at step 710. In one case, if the application is being timed, the at least one processing device 102 may start timing, at step 712. Successively, the at least one processing device 102 may determine whether a next monitored application can be acquired, at step 714. If the next monitored application can be acquired, then the method follows the step 710. Otherwise, the at least one processing device 102 may end the process. In another case, if the application is not being timed, then the method follows the step 714.

Figure 8:
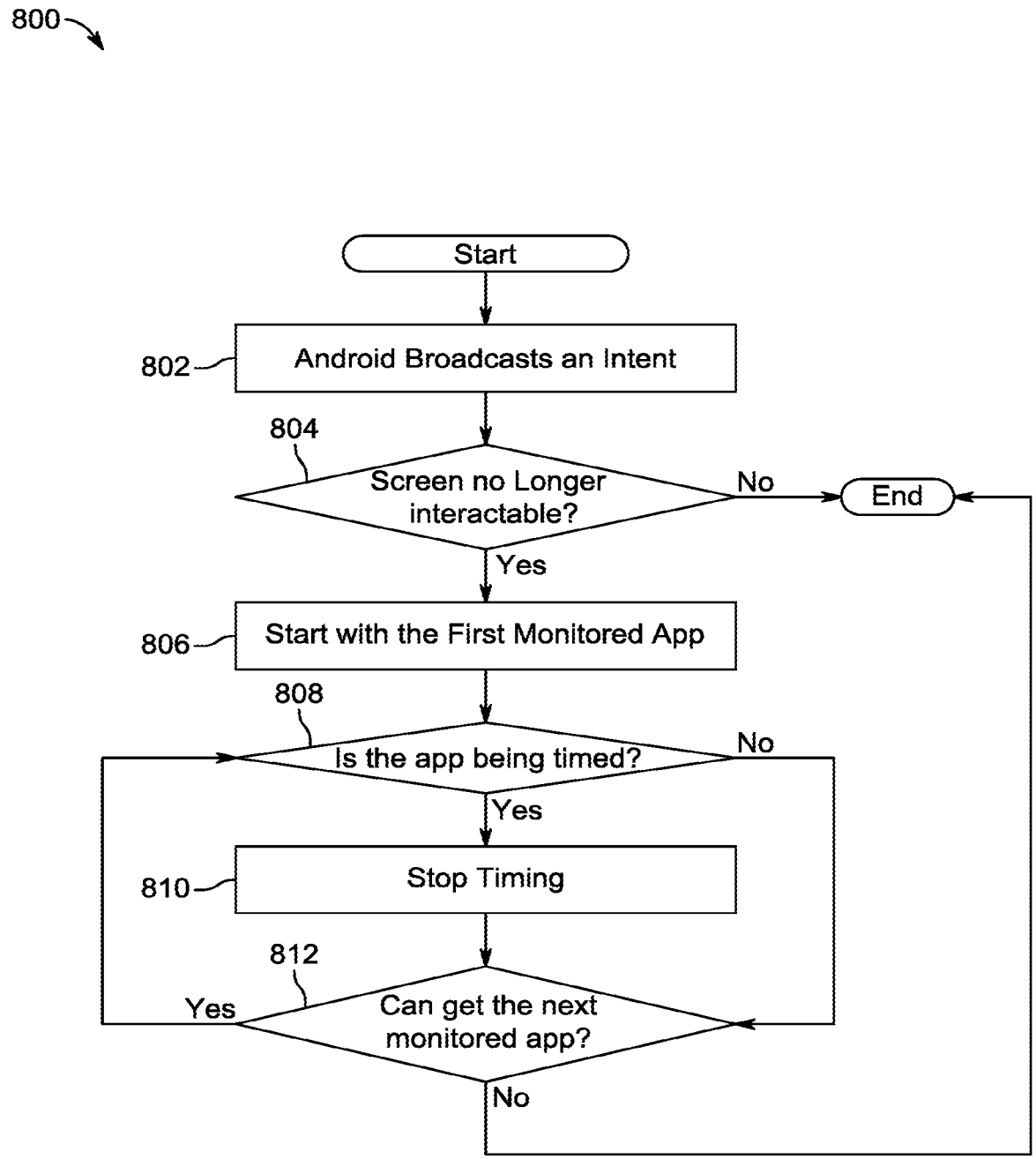
FIG. 8 is a flowchart 800 illustrating a method for detecting non-interactable screen, in accordance with at least one embodiment.

FIG. 8 is a flowchart 800 illustrating a method for detecting a non-interactable screen, in accordance with at least one embodiment. The flowchart 800 is described in conjunction with FIGS. 1, 2A, 2B, 2C, and 2D.

At first, Android broadcasts an intent, at step 802. Successively, the at least one processing device 102 may determine whether the screen is no longer interactable, at step 804. In one case, if the screen is interactable, then the at least one processing device 102 may stop the process. In another case, if the screen is no longer interactable, then the at least one processing device 102 may start with a first monitored application, at step 806. Successively, the at least one processing device 102 may determine whether the application is being timed, at step 808. In one case, if the application is being timed, then the at least one processing device 102 may stop timing the application, at step 810. Successively, the at least one processing device 102 may determine whether a next monitored application can be acquired, at step 812. In one case, if the next monitored application can be acquired, then the method follows the step 808. Otherwise, the at least one processing device 102 may end the process. In another case, if the application is not being timed, then the method follows the step 812.

Figure 9:
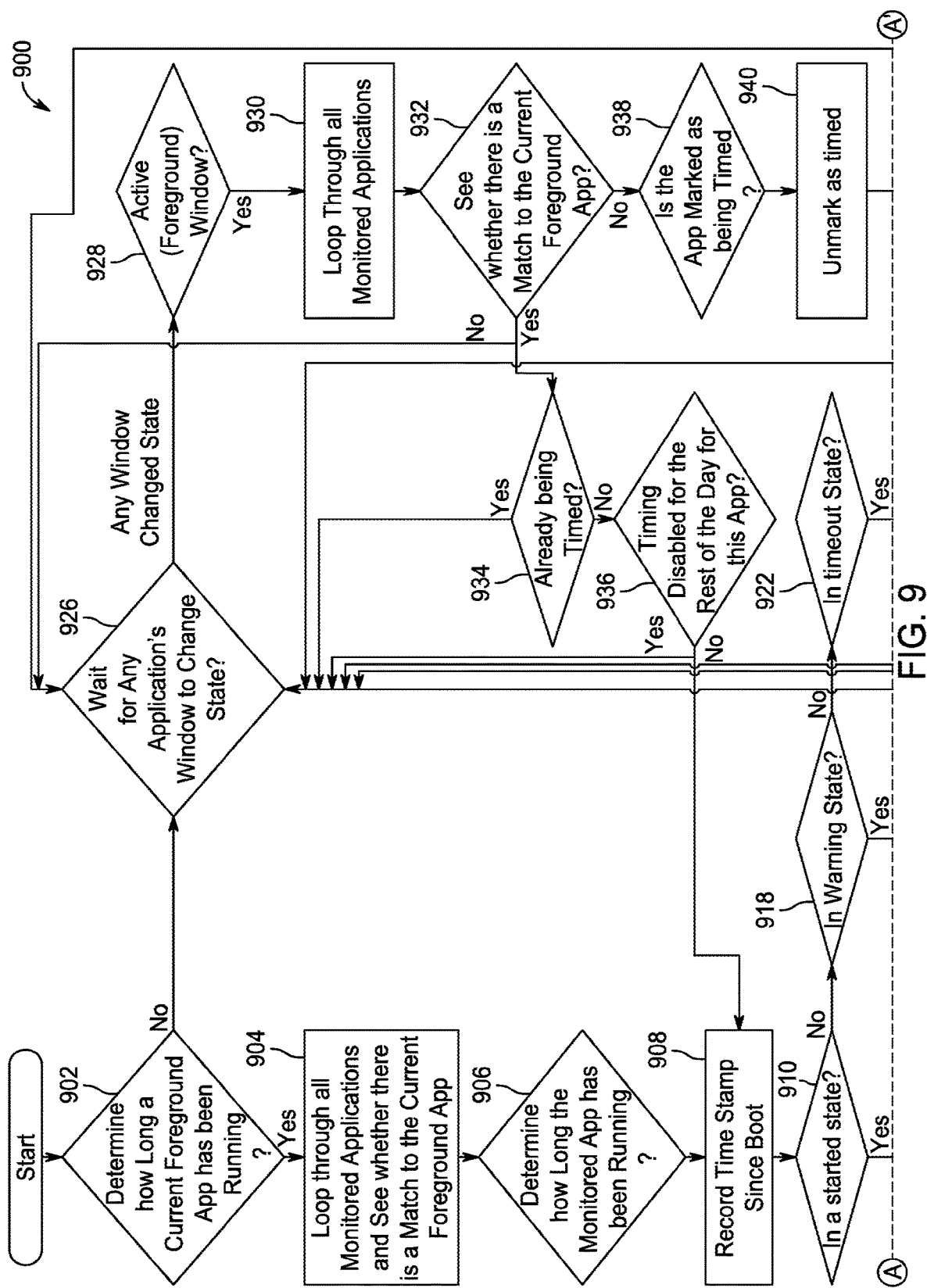
FIG. 9 is a flowchart 900 illustrating a method for limiting maximum run time for an application, in accordance with at least one embodiment.
Figure 9:
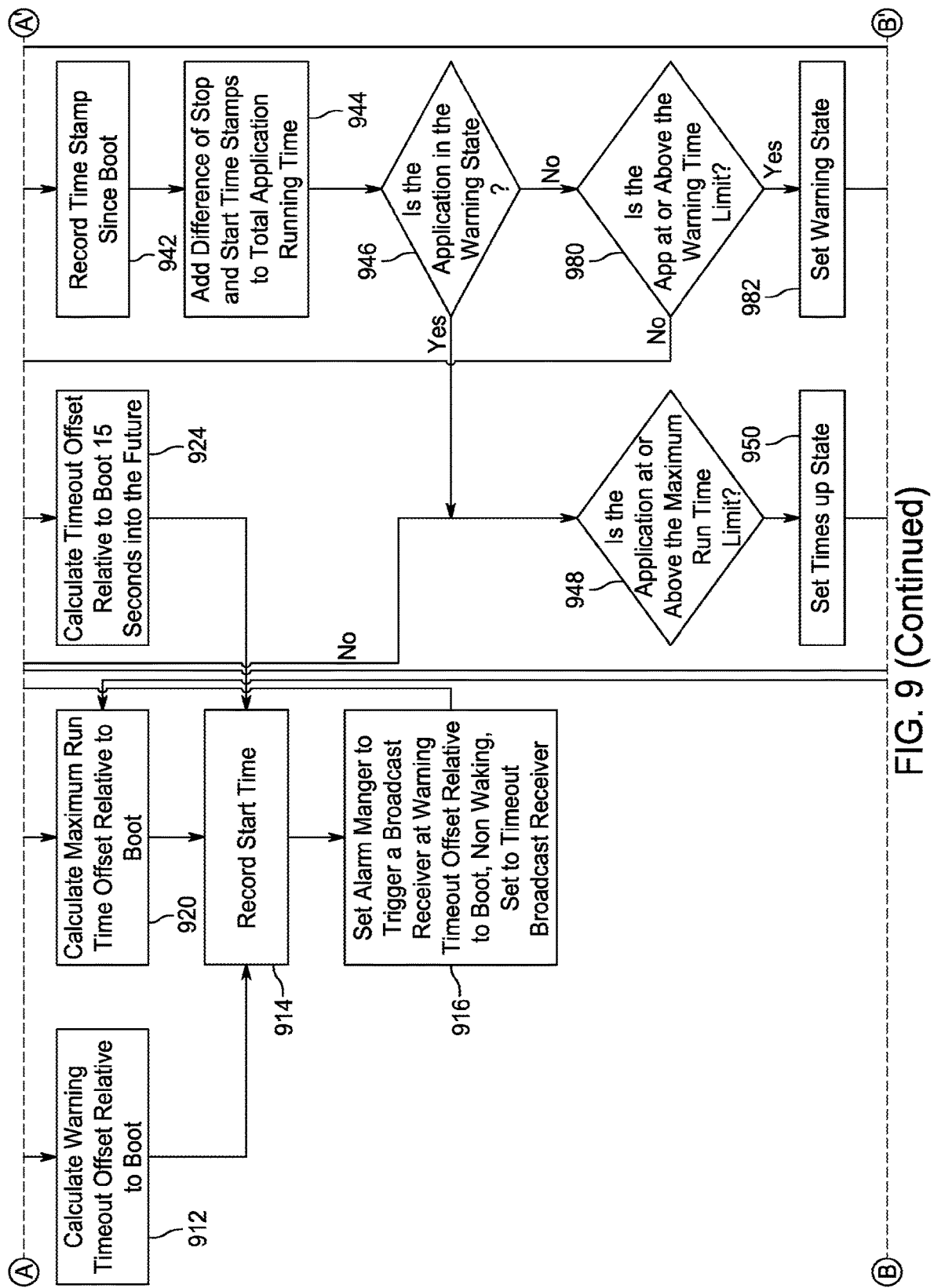
Figure 9:
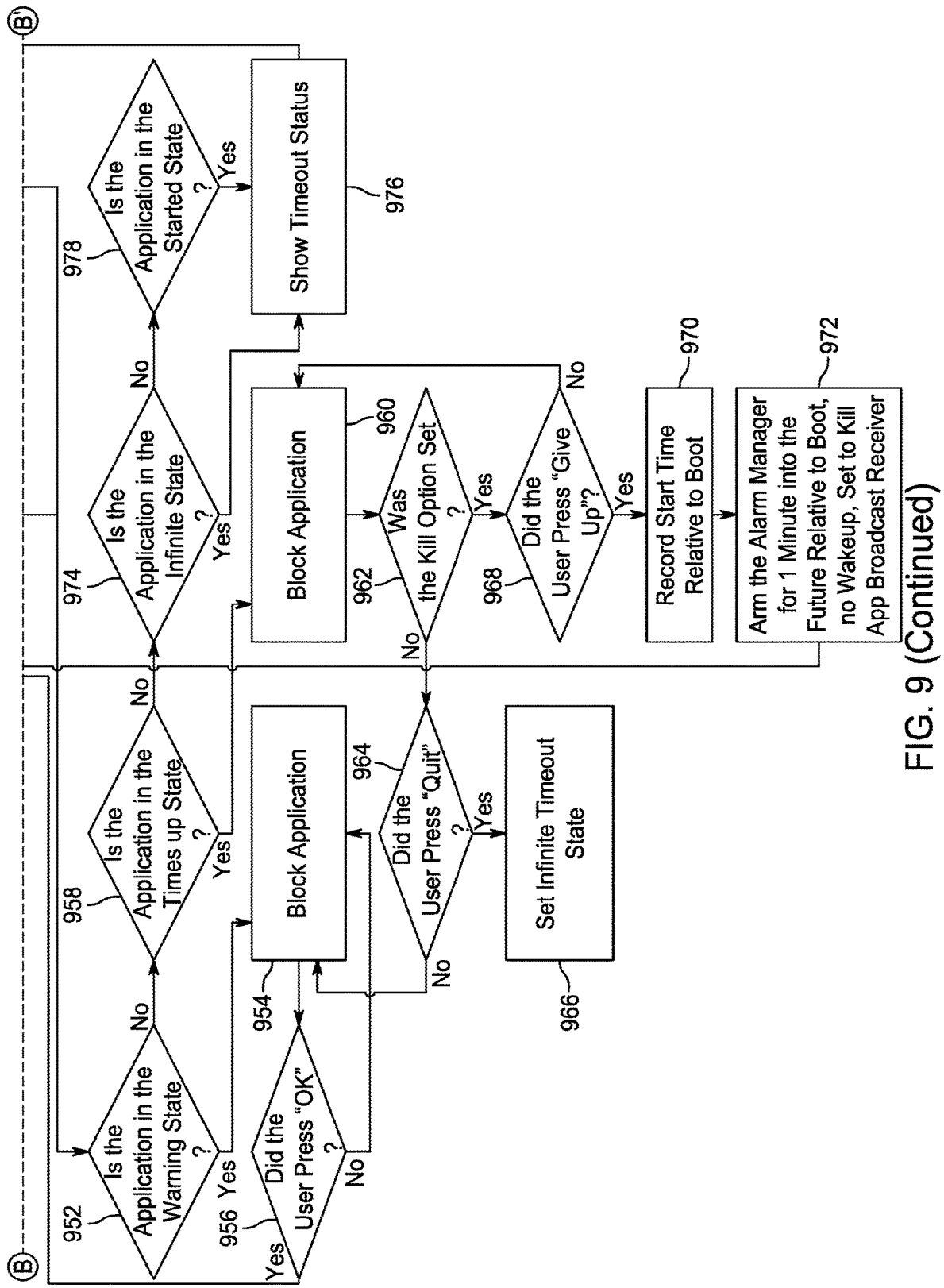

FIG. 9 is a flowchart 900 illustrating a method for limiting maximum run time for an application, in accordance with at least one embodiment. The flowchart 900 is described in conjunction with FIGS. 1, 2A, 2B, 2C, and 2D.

At first, the at least one processing device 102 may determine how long a current foreground application (App) has been running, at step 902. In one case, if it is determined that how long the current foreground App has been running, then the at least one processing device 102 may loop through one or more monitored applications and may see whether there is a match to the current foreground App, at step 904. Based at least on the matching, the at least one processing device 102 may determine how long a monitored application has been running, at step 906. Successively, time stamp is recorded since boot, at step 908. Successively, the at least one processing device 102 may check whether the monitored application is in a started state, at step 910. In one case, when the monitored application is in the started state, then a warning timeout offset relative to boot is calculated, at step 912. Successively, start time is recorded, at step 914. Thereafter, an alarm manager is set to trigger a broadcast receiver at the warning timeout offset relative to boot, non-waking, and set to timeout broadcast receiver, at step 916.

In another case, when the monitored application is not in the started state, then the at least one processing device 102 may determine whether the monitored application is in a warning state, at step 918. When the monitored application is in the warning state, then maximum run time offset relative to boot is calculated, at step 920. Successively, start time is recorded, at step 914. Thereafter, an alarm manager is set to trigger a broadcast receiver at the warning timeout offset relative to boot, non-waking, and set to timeout broadcast receiver, at step 916. In another case, when the monitored application is not in the warning state, then the at least one processing device may determine whether the monitored application is in timeout state, at step 922. Successively, timeout offset relative to boot 15 seconds into the future is calculated, at step 924. Thereafter, the method follows the step 914 to step 916.

Successively, the at least one processing device 102 may wait for any application's window to change state, at step 926. In one embodiment, if it is not determined that how long the current foreground App has been running, then the method follows the step 926. It should be noted that the change state may include, but are not limited to, foreground to background and/or minimized. Successively, if the application's window changes state, then the at least one processing device 102 may determine whether there is active (foreground) window, at step 928. Successively, the at least one processing device 102 may loop through the one or more monitored applications, at step 930. Successively, the at least one processing device 102 may see whether there is a match to the current foreground App, at step 932. Based at least on the determination, if there is a match to the current foreground application, then the at least one processing device may determine whether the application is already being timed, at step 934. If the application is already being timed, then the method follows the step 926. Otherwise, the at least one processing device 102 may determine whether timing disabled for rest of the day for the application, at step 936. Thereafter, if it is determined that the timing is not disabled for rest of the day for the application, then timestamp since boot is recorded, at step 508. Otherwise, the method follows the step 926.

As discussed above at step 932, if there is no match to the current foreground App, then the method follows the step 926 or the at least one processing device 102 may determine whether the application marked as being timed, at step 938. Successively, unmark the application as timed, at step 940. Successively, time stamp since boot is recorded, at step 942. Successively, a difference of stop time stamp and start time stamp is added to a total application run time, at step 944. Successively, the application in the warning state is determined, at step 946. In one case, if the application is in the warning state, then the at least one processing device 102 may determine whether the application is at or above maximum run time limit, at step 948. Successively, the times up state is set, at step 950. Successively, the at least one processing device 102 may determine whether the application is in the warning state, at step 952. In one case, if the application is in the warning state, then the application is blocked, at step 954. Successively, the at least one processing device 102 may check whether the user pressed "OK", at step 956. In one case, if it is checked that the user pressed "OK", then the method follows the step 920. Otherwise, the method follows the step 954.

In another case, if the application is not in the warning state, then the at least one processing device 102 may determine whether the application is in the times up state, at step 958. Based at least on the determination, if the application is in the times up state, then the application is blocked, at step 960. Successively, the at least one processing device 102 may determine whether the kill option was set, at step 962. If the kill option was not set, then the at least one processing device 102 may determine whether the user pressed "Quit", at step 964. If the user has pressed "Quit", then infinite timeout state is set, at step 966. Otherwise, the application is blocked, at step 954.

In another case, if the kill option was set, then the at least one processing device 102 may determine whether the user pressed "Give Up", at step 968. In one case, if the user has not pressed "Give Up", then the application is blocked, at step 960. Otherwise, start time relative to boot is recorded, at step 970. Successively, the alarm manager is armed for 1 minute into the future relative to boot, no wakeup, and set to kill app broadcast receiver, at step 972. Thereafter, the method follows the step 926.

Further, in another case, if the application is not in the times up state, then the at least one processing device 102 may determine whether the application is in the infinite state, at step 974. In one case, if the application is in the infinite state, then timeout status is shown, at step 976. Thereafter, the method follows the step 926. In another case, if the application is not in the infinite state, then the at least one processing device 102 may determine whether the application is in the started state, at step 978. If the application is in the started state, then the timeout status is shown, at step 976. Thereafter, the method follows the step 926.

As discussed above at step 946, if the application is not in the warning state, then the at least one processing device 102 may determine whether the application is at or above the warning threshold (i.e. warning time limit), at step 980. In one case, if the application is at or above the warning threshold (i.e. warning time limit), then a warning state is set, at step 982. Thereafter, the method follows the step 952. In another case, if the application is not at or above the warning threshold (i.e. warning time limit), then the method follows the step 926.

It will be apparent to one skilled in the art that the above-mentioned embodiments or instructions of the invention may be executed by the at least one processing device 102 of the device 100 using the software application or by a server, without departing from the scope of the disclosure.

The disclosed embodiments encompass numerous advantages. Various embodiments of method and device for limiting maximum run time for an application have been disclosed. Such method provides a way of controlling time management and parental control software through a use of an application-timing algorithm. The application-timing algorithm is implemented on the Android operating system. The method includes receiving at least one user preference. The at least one user preference includes a selection of one or more monitored applications and one or more warning thresholds corresponding to the one or more monitored applications. The one or more warning thresholds comprise a user selected time period. Further, time information associated with a use of the one or more monitored applications, is obtained. The time information is determined according to an accessibility event notifications function, on an operating system of a device. Further, the at least one user preference and the obtained time information are compared to determine whether the one or more warning thresholds have been exceeded. Thereafter, a notification is delivered to the user, upon exceeding the one or more warning thresholds. Such notifications are more power-efficient because the computer can sleep between notifications.

Further, memory allocations and other resources don't need to be kept around between the notifications, and thus giving other programs more opportunities to use more memory. Further, the program code executes only when the notification occurs, thus using less power because work only occurs based on the requirement. Further, there is no need to keep the device awake, as the user can't use the device when the screen is off.

Further, such invention provides for a resilient, fault-tolerant design, which utilizes accessibility event notifications to determine when a monitored application becomes usable. It should be noted that such method utilizes the accessibility services feature in the Android operating system for determining how long the application is allowed to run on a daily basis. The use of the accessibility service feature may help people with disabilities. Such approach runs tracking code only when it is needed. Because onAccessibilityEvent is called within 100 ms of an application going to the foreground or the background, and thus such invention has much lower latency than polling.

Further, an owner-installed application may use the operating system services that came with the device at its time of purchase. Further, Android can terminate the application at any time for reasons such as extending the device's battery life or reclaiming memory for other applications or its own use. Further, Android ensures that the application is responsive, and will kill or pop up a message saying that the application is not responding. Further, such invention prevents uninstall of the application by looking for sysui package name and control ID. It should be noted that a general mechanism for blocking an ID and a package name is provided and thus allows the user to lock down other potential mutators of supermoose. Further, redo user interface for monitoring of applications is provided and a statistics page is provided for showing where time went between monitored applications.

Such method and device provide parental controls. The child requires login from the parent for ages thirteen years and below. Further, the user creates multiple user profiles within an Android user profile. Further, the multiple Android profiles may be supported for the user. Thus, such method provides password reset mechanism, ability to ask for more time through an SMS or an e-mail sent to the parent, allow applications to be blocked according to categories, such as games and homework, limit time usage of web sites, update daily limit time resets according to Network News Transfer Protocol (NNTP) servers, and play sound or speak the time left so that gameplay is not disturbed.

In one embodiment, remaining time of the application is displayed in an overlay window when the user approaches the warning threshold or the maximum time limit. Further, Nyquist's theorem may be applied as a worst-case description of latency with monitoring applications and may be used in various embodiments of the present invention. It should be noted that such invention may be beneficial for all types of users whether a good user or a bad user. For example, the good user may need an aid to manage time. The bad user may need more incentive. Thus, such method and device offers a unique approach to application management using notifications and features designed for helping people with disabilities. Therefore, such method results in increasing reliability and stability of long-term timing, is resilient to interruptions, and does not require polling.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

While the preferred embodiment of the present invention has been illustrated and described, as noted above, many changes can be made without departing from the spirit and scope of the invention. For example, aspects of the present invention may be adopted on alternative operating systems. Accordingly, the scope of the invention is not limited by the disclosure of the preferred embodiment. Instead, the invention should be determined entirely by reference to the claims that follow.

What is claimed is:

1. A non-transitory computer-readable medium for storing instructions, wherein the instructions are executed by at least one processing device, and wherein the at least one processing device is configured to:

store at least one user preference comprising a selection of one or more monitored applications, one or more warning thresholds corresponding to the one or more monitored applications, a maximum time limit corresponding to the one or more monitored applications, and a kill feature corresponding to the one or more monitored applications, wherein the one or more warning thresholds comprise a user-selected time period;

obtain time information associated with a use of the one or more monitored applications, wherein the obtained time information is determined according to an accessibility event notifications function of an operating system of the at least one processing device and to exclude time during which a screen associated with the at least one processing device and configured to display content generated by the one or more monitored applications is non-interactable;

compare the at least one user preference and the obtained time information to determine whether the one or more warning thresholds have been exceeded;

deliver a notification, upon determining that the one or more warning thresholds have been exceeded, to a user;

kill the one or more monitored applications when the maximum time limit corresponding to the one or more monitored applications has been exceeded; and delay killing the one or more monitored applications in response to the user indicating use of the one or more monitored applications.

2. The non-transitory computer-readable medium according to claim 1, wherein the at least one user preference further comprises e-mail preferences, application monitoring, analytics, crash reporting, and monitoring preferences.

3. The non-transitory computer-readable medium according to claim 1, wherein the user-selected time period comprises at least one of a number of hours per day or a number of hours per week.

4. The non-transitory computer-readable medium according to claim 1, wherein the use of the one or more monitored applications is being monitored based on one or more time frames.

5. The non-transitory computer-readable medium according to claim 1, wherein the instructions are performed using a software application running on the at least one processing device.

6. The non-transitory computer-readable medium according to claim 5, wherein the software application is used by the user to create a profile for selecting or deselecting the one or more monitored applications and to create multiple profiles for making different timing goals.

7. The non-transitory computer-readable medium according to claim 1, wherein the screen associated with the at least one processing device is non-interactable while unpowered.

8. A method, comprising:
receiving, by at least one processing device, at least one user preference comprising a selection of one or more monitored applications, one or more warning thresholds corresponding to the one or more monitored applications, a maximum time limit corresponding to the one or more monitored applications, and a kill feature corresponding to the one or more monitored applications, wherein the one or more warning thresholds comprise a user-selected time period;

obtaining, by the at least one processing device, time information associated with a use of the one or more monitored applications, wherein the obtained time information is determined according to an accessibility event notifications function of an operating system of the at least one processing device and to include only time during which at least one screen associated with the at least one processing device and configured to render content generated by the one or more monitored applications is interactable;

comparing, by the at least one processing device, the at least one user preference and the obtained time information to determine whether the one or more warning thresholds have been exceeded;

delivering, by the at least one processing device, a notification, upon determining that the one or more warning thresholds have been exceeded, to a user;

killing, by the at least one processing device, the one or more monitored applications in response to the maximum time limit corresponding to the one or more monitored applications being exceeded; and delaying, by the at least one processing device, killing the one or more monitored applications in response to the user indicating use of the one or more monitored applications.

9. The method of claim 8, wherein the at least one user preference further comprises e-mail preferences, application monitoring, analytics, crash reporting, and monitoring preferences.

10. The method of claim 8, wherein the user-selected time period comprises at least one of a number of hours per day or a number of hours per week.

11. The method claim 8, wherein the use of the one or more monitored applications is being monitored based on one or more time frames.

12. The method of claim 8, wherein the method is being performed using a software application running on the at least one processing device.

13. The method of claim 8, wherein the at least one screen associated with the at least one processing device is interactable while powered.

14. The method of claim 8, wherein the at least one screen associated with the at least one processing device is interactable while in display mode.

15. A device, comprising:
at least one processing circuit that is configured to:
store at least one user preference comprising a selection of one or more monitored applications, one or more warning thresholds corresponding to the one or more monitored applications, a maximum time limit corresponding to the one or more monitored applications, and a kill feature corresponding to the one or more monitored applications, wherein the one or more warning thresholds comprise a user-selected time period;

obtain time information associated with a use of the one or more monitored applications, wherein the obtained time information is determined according to an accessibility event notifications function of an operating system of the device and to exclude time during which a screen associated with the device and configured to display content generated by the one or more monitored applications is non-interactable;

compare the at least one user preference and the obtained time information to determine whether the one or more warning thresholds have been exceeded;

deliver a notification, upon determining that the one or more warning thresholds have been exceeded, to a user;

kill the one or more monitored applications in response to the maximum time limit corresponding to the one or more monitored applications being exceeded; and delay killing the one or more monitored applications in response to the user indicating use of the one or more monitored applications.

16. The device of claim 15, wherein the at least one user preference further comprises e-mail preferences, application monitoring, analytics, crash reporting, and monitoring preferences.

17. The device of claim 15, wherein a software application running on the device is being used by the user to create a profile for selecting or deselecting the one or more monitored applications and to create multiple profiles for making different timing goals.

18. The device of claim 15, wherein the screen associated with the device is non-interactable while in screen-saver mode.

* * * * *